United States Patent
Schmitt et al.

(10) Patent No.: US 9,815,009 B2
(45) Date of Patent: Nov. 14, 2017

(54) FILTER DEVICE

(75) Inventors: Ralf Schmitt, Tholey (DE); Thomas Scholl, Saarlouis (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 784 days.

(21) Appl. No.: 13/261,633

(22) PCT Filed: Oct. 6, 2011

(86) PCT No.: PCT/EP2011/004985
§ 371 (c)(1),
(2), (4) Date: May 10, 2013

(87) PCT Pub. No.: WO2012/052117
PCT Pub. Date: Apr. 26, 2012

(65) Prior Publication Data
US 2013/0228507 A1 Sep. 5, 2013

(30) Foreign Application Priority Data
Oct. 18, 2010 (DE) .................. 10 2010 049 974

(51) Int. Cl.
*B01D 35/30* (2006.01)
*B01D 35/157* (2006.01)
(Continued)

(52) U.S. Cl.
CPC ....... *B01D 35/157* (2013.01); *B01D 35/0276* (2013.01); *B01D 35/143* (2013.01);
(Continued)

(58) Field of Classification Search
CPC ........ B01D 29/23; B01D 29/70; B01D 29/88; B01D 29/90; B01D 29/96; B01D 35/027; B01D 35/0276; B01D 35/153; B01D 35/30; B01D 35/306; B01D 2201/16; B01D 2201/167; B01D 2201/291; B01D 2201/301; B01D 2201/302; B01D 2201/304; B01D 2201/307
See application file for complete search history.

(56) References Cited

U.S. PATENT DOCUMENTS

2013/0233783 A1* 9/2013 Schmitt .................. 210/234

FOREIGN PATENT DOCUMENTS

DE 10 2004 014149 A1 10/2005
DE EP 1652566 A1 * 5/2006 ............ B01D 29/21
(Continued)

OTHER PUBLICATIONS

DE102009007389B3—EPO Machine Translation (Description), 2015, 12 pages.*
(Continued)

*Primary Examiner* — Patrick Orme
(74) *Attorney, Agent, or Firm* — Wenderoth, Lind & Ponack, L.L.P.

(57) ABSTRACT

A filter device has at least one filter element (37) accommodated in a filter housing fluid-connected to a fluid tank (1). The filter housing has at least one connection fitting (29) forming a fluid connection to the filter element (37). The filter housing is formed by a filter bowl (13) molded into the tank (1). The bowl bottom (17) has the connection fitting (29) associated with the element receiver.

15 Claims, 2 Drawing Sheets

(51) Int. Cl.
  *B01D 35/027*  (2006.01)
  *B01D 35/143*  (2006.01)
(52) U.S. Cl.
  CPC ..... *B01D 35/1573* (2013.01); *B01D 35/1576* (2013.01); *B01D 35/30* (2013.01); *B01D 2201/291* (2013.01)

(56) References Cited

FOREIGN PATENT DOCUMENTS

| DE | 10 2005 001 828 A1 | 7/2006 | |
|---|---|---|---|
| DE | 202005012435 U1 * | 1/2007 | |
| DE | 10 2006 011844 A1 | 9/2007 | |
| DE | 102009007389 B3 * | 4/2010 | ............. B01D 29/21 |

OTHER PUBLICATIONS

DE202005012435—EPO Machine Translation (Description), 2015, 3 pages.*
DE102009007389—USPTO Human Translation (2015), 31 pages.*
DE202005012435—USPTO Human Translation (2015), 16 pages.*
EP1652566A1—EPO Machine Translation, 2016, 11 pages.*

* cited by examiner

FILTER DEVICE

FIELD OF THE INVENTION

The invention relates to a filter device having at least one filter element accommodated in a filter housing that is fluid-connected to a fluid tank and that has at least one connection unit for forming a fluid connection to the filter element.

BACKGROUND OF THE INVENTION

Filter devices of this type are readily available on the market in a plurality of constructions and versions. Such filter devices are used mainly to filter fouling in fluids such as hydraulic oil. Fouling of the hydraulic oil occurs in the installation or in the start-up of the respective hydraulic system. In addition to this initial fouling, fouling can occur during operation, for example, by penetration of dirt at the hydraulic tank as a result of inadequate tank ventilation, pipe penetrations, piston rod seals, and the like. Fouling can occur within the fluid stored in the hydraulic tank, especially in the hydraulic systems of heavy machinery such as earth moving machines, excavators, or the like. Furthermore, in these types of applications of the filter device, effecting filtration directly in the region of the hydraulic tank, for example, by installing the filter device directly in the tank, can be useful.

Under conditions of use as prevail in operation of the filter device in construction machinery or other machinery operated in the open, due to the higher fouling rates that arise, frequent changing of the filter element must be done. In the course of handling the used, i.e., fouled, filter elements, in these known solutions, the risk exists that contamination both of the system, i.e., especially of the filter housing and the tank, and also of the environment will occur.

DE 10 2006 011 844 B4 discloses a filter element with a filter bowl that borders an interior, with a bottom part having a flow passage, with a filter medium located in the interior of the filter bowl, and with a valve body of a valve apparatus. The valve body can be actuated by the fluid pressure on the fluid passage of the bottom part. The valve body has a screen-like, flexible closing jacket that blocks the fluid passage in the opened-up state, is moved by the fluid pressure in the direction to its closed position, and clears the fluid passage. The closing jacket in its central region is fixed on a carrier within the filter element. The ring body of the bottom part makes a ring edge forming the valve seat sealing surface and projecting to the inside.

DE 10 2005 001 828 A1 discloses a generic filter device, especially a fitting for forming a fluid-carrying connection to a plastic container, preferably in the form of a tank for accommodating a fluid, specifically a hydraulic fluid. The fitting has a connection part in the form of a hollow body with a jacket extending along one longitudinal axis of the hollow body between its ends. The hollow body is embedded in the plastic of the wall of the container such that one open end of the hollow body on the edge of an opening of the container and at least one partial region of the jacket of the hollow body are surrounded by the plastic of the wall of the container.

The hollow body is preferably produced from a metallic material, enables not only the reliable connection to connection parts or attachment parts forming a component of the pertinent hydraulic system, but also contributes concomitantly to reinforcing that region of the plastic container or tank located in the region of the opening.

With regard to the possibilities of comparatively simple forming, of low weight and of corrosion resistance relating to the plastic tank, the known solution, however, leaves much to be desired. The known solution is also relatively complex with respect to the host of components to be used and is therefore costly in production.

SUMMARY OF THE INVENTION

An object of the invention is to provide an improved filter device of the indicated type that enables a reliable, long-term, leak-free port connection on an opening of a plastic container or plastic tank and that helps avoid the aforementioned disadvantages.

This object is achieved by a filter device where the filter housing is formed by a filter bowl molded into the tank. On the filter bowl bottom, the connection unit of the element receiver is located. In this way, the filter element can be directly inserted into the filter bowl of the filter tank without additional insertion bodies, metallic hollow bodies, or the like. This arrangement can be produced relatively easily, with at the same time a high sealing action in the region of the insertion site into the tank being achieved. In addition, corresponding weight is reduced since the number of components to be used can be reduced accordingly. Especially advantageously, this structure eliminates a filter housing to be installed in the tank because the filter bowl itself, as an integral component of the tank, forms the filter housing.

In especially advantageous exemplary embodiments, on the bottom of the filter bowl a connecting piece is molded that forms a passage for the connection fitting. The connection fitting is joined to a bottom-side wall section of the tank. Through that wall section, the connection fitting extends from the outside of the tank into the filter bowl.

Especially advantageously, the wall section of the tank adjoining the connecting piece is located in a local indentation that extends upward from the base of the tank. This arrangement forms a "countersink" in the bottom-side connection completely into the bottom of the tank. As a result, advantages arise for the installation of the tank in heavy machinery with little available installation space.

Preferably, the connection fitting in the connecting piece is fixed by a screw union that can be a standard screw-in design.

The tank together with the filter bowl that forms an integral component of it can be especially advantageously molded out of plastic.

Furthermore, the filter bowl is open on the top of the tank and can be advantageously closed by a plastic cover screwed to an internal thread located on the edge region of the filter bowl. The cover, with its outside, then forms a part of the upper tank wall. In these exemplary embodiments, a fluid connection proceeding from the tank bottom, the tank with one wall part forms an outer skin part of the pertinent machinery, and only the cover of the filter bowl on the outer skin is visible of the entire filter device.

Preferably, the connection unit for the supply of the fluid to be cleaned leads to the dirty side of the filter element and is a component of the element receiver with which the filter element, which is in the operating position, interacts. The filter element has a valve arrangement that normally closes the inlet to its dirty side and that can be opened when the filter element is attached to the element receiver. This valve arrangement eliminates the risk that when the filter element is being replaced, fouling that has become attached and/or that has been deposited on the used filter element on the dirty side, when the used filter element is withdrawn from the element receiver, can fall off the filter element and can travel to the clean side. In conjunction with changing the filter element, therefore, no subsequent operations need be carried out to clean the filter housing.

In especially advantageous exemplary embodiments, the filter housing is formed by a filter bowl molded into the tank and on whose bottom the connection unit belonging to the element receiver is located. Especially advantageously, this arrangement eliminates a filter housing to be installed in the tank because the filter bowl itself as an integral component of the tank forms the filter housing.

The arrangement in this case is especially advantageously such that the filter element flow can take place from its inner filter cavity to the outside of its filter medium during filtration. The lower end cap, in the operating position interacts with the element receiver having an inlet fitting that projects into the filter cavity where the valve arrangement is attached. In the operating position, the valve arrangement engages a connection fitting of the connection unit as a component of the element receiver with sealing.

To form the valve arrangement, the end of the inlet fitting can be spanned by a cap of elastomer material provided with notches. The connection fitting of the connection unit then penetrates the inlet fitting in the operating position and opens the notches of the cap to form flow slots by mechanical action on the cap. This construction of the valve arrangement can be easily produced especially economically so that the presence of the valve arrangement on the filter element increases its production costs only slightly.

Alternatively, the valve arrangement on the inlet fitting can have a movable valve body pretensioned by a mechanical closing force into the closed position blocking the inlet fitting. When the filter element is attached to the element receiver, it can be moved out of the closed position by the mechanical action of the connection fitting against the closing force. Advantageously, in this valve design, as in the use of an elastomer valve cap, no mechanical effort on the part of the connection unit is necessary for valve actuation, because in both cases the valve opening takes place by mechanical action by the connection fitting of the connection unit that, in the operating position of the filter element, penetrates its inlet fitting.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a of this disclosure.

DETAILED DESCRIPTION OF THE INVENTION

Figure 1:
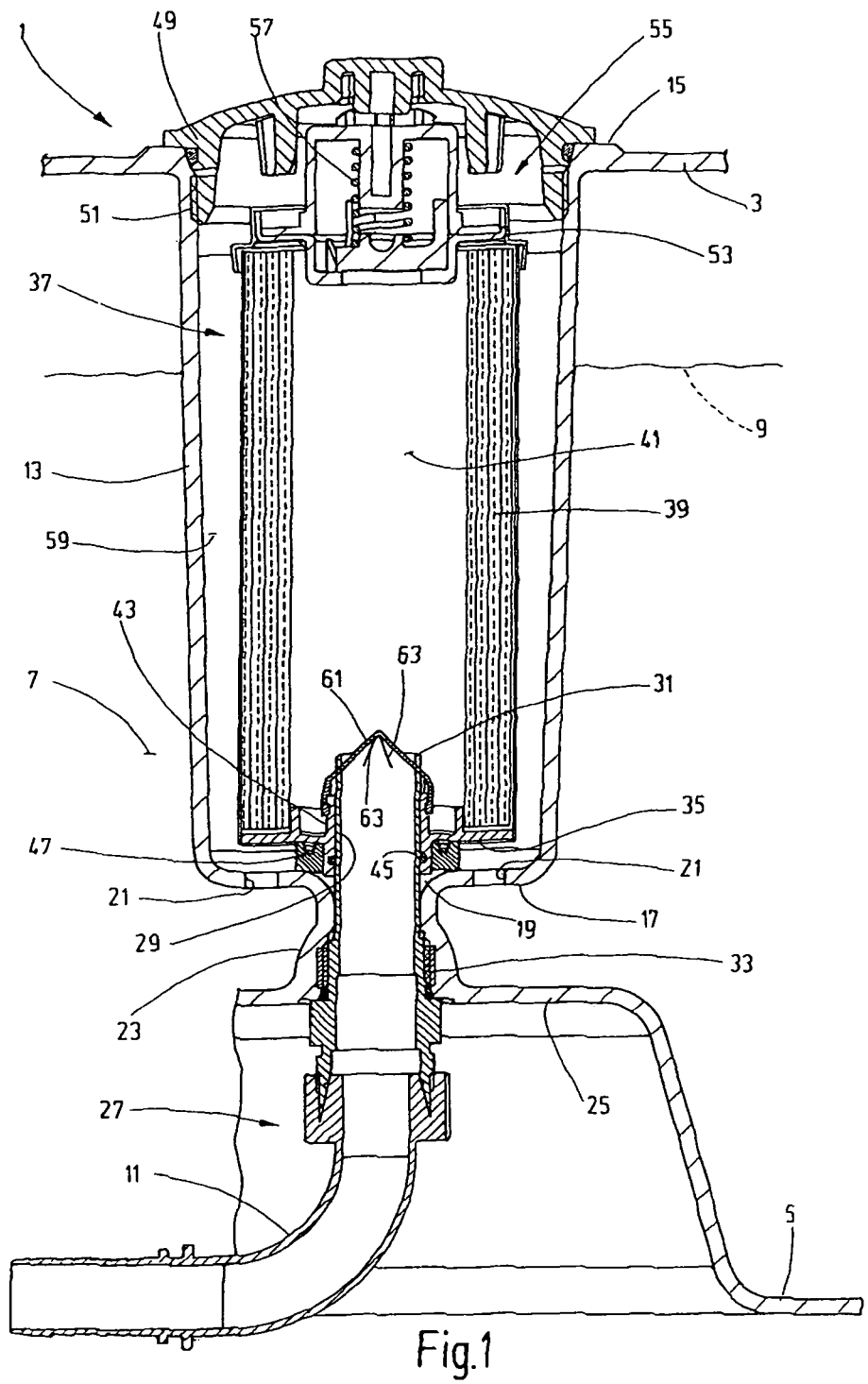
FIG. 1 is a side elevational view in section of a fluid tank with a filter device according to a first exemplary embodiment of the invention.

The fluid tank 1, designed to accommodate a supply of hydraulic fluid, is shown in the drawings only by an upper wall section 3 and a lower wall section 5. Together with other wall parts that are not shown, wall sections 3, 5 delineate an interior 7 for hydraulic fluid at a level 9. Tank 1 is a component of a hydraulic system of a heavy machine, for example, in the form of a small excavator. Of the hydraulic system, only one tank return line 11 is shown via which hydraulic fluid to be cleaned is supplied to the filter device and, after completed cleaning, is returned by it to the interior 7 of the tank 1.

Tank 1 is made out of plastic material compatible with hydraulic fluid in a rotary molding method. A filter bowl 13 molded integrally to the tank walls extends inward. The bowl 13 is open on the top 15 of the tank and extends vertically from the top 15 of the tank into the vicinity of the base of the tank 1, relative to the installation position of the tank 1. The bowl bottom 17 has a centrally located connection opening 19 and outflow openings 21 located laterally from opening 19 via which cleaned fluid travels out of the filter bowl 13 into the interior 7 of the tank 1. The connection opening 19 on the bowl bottom 17 is connected to a connecting piece 23 via which the bowl bottom 17 is connected to the lower wall section 5 of the tank 1. As the drawings show, a port connection 27 of the return line 11 on the filter device is placed within an indentation 25 arched upward from the base of the tank 1 so that the connection fitting is "countersunk" within the tank bottom.

From the port connection 27 of the return line 11, a connection fitting 29 extends in the form of a cylindrical hollow body that is stepped on its outside through the connecting piece 23 and the connection opening 19 of the bowl 13 into its interior. The end 31 of the connection fitting 29 is located at a distance from the bowl bottom 17. The connection fitting 29 is fixed in the connecting piece 23 by a threaded insert 33 and forms a component of an element receiver that interacts with the lower end cap 35 of a filter element 37 to fix the filter element 37 within the filter bowl 13 in its operating position. The filter bowl 13 acts as a filter housing.

The filter element 37, shown in its operating position in the drawing, on its lower end cap 35 conventionally forms an enclosure for a filter medium 39 in the form of a hollow cylinder surrounds an inner filter cavity 41 and has a central inlet fitting 43 that can be slipped onto the connection fitting 29 in the operating position. A sealing element 45 on the inlet fitting 43 seals relative to the connection fitting 29. The element receiver completes a spacer ring 47 of elastomer material surrounding the inlet fitting 43 and defining the axial positioning between the end cap 35 and the bowl bottom 17.

The filter bowl 13 is open on the top 15 of the tank and can be closed by a plastic cover 49 screwed to an internal thread 51 located on the edge region of the filter bowl 13. The cover 49 is visible only with its outside on the top 15 of the tank. A bypass valve 55 is located between the cover 49 and the upper end cap 53 of the filter element 37. With a correspondingly prevailing differential pressure, bypass valve 55 conventionally clears a fluid connection between the inner filter cavity 41 and the outside of the filter element 37. Closing spring 57 keeps the bypass valve 55 in the closed, normal operating position.

During filtration, the hydraulic fluid flowing into the filter cavity 41, via the connection fitting 29, flows through the filter medium 39 from the inside to the outside. The cleaned fluid from the space of the filter bowl 13 surrounding the filter medium 39 and forming the clean side 59 flows back into the interior 7 of the tank 1 via the outflow openings 21. In the exemplary embodiment of FIG. 1, on the free end region of the inlet fitting 43 projecting into the filter cavity 41, a valve arrangement is formed from a valve cap 61 of elastomer material and traverses the end of the inlet fitting 43. This cap 61 has several notches 63. Without mechanical action applied to the valve cap 61, the valve cap 61 with the notches 63 closed forms a closure of the inlet fitting 43. If, however, the filter element 37, as is shown in FIG. 1, is moved into the operating position and is slipped onto the connection fitting 29, with the inlet fitting 43, the valve cap 61 is opened up by mechanical action of the free end 31 of the connection fitting 29 in the manner shown in FIG. 1. As a result, the notches 63 are widened into flow slots, so that fluid flows into the filter cavity 41 through the connection fitting 29 for the filtration process. If the filter element 37 is withdrawn from the connection fitting 29 for element replacement, the valve cap 61 returns into the unwidened position in which the cap 61 with the notches 63 closed closes the end of the inlet fitting 43. This process prevents fouling located in the filter cavity 41, i.e., the dirty side, from falling out of the filter element 37, and flailing the clean side when the filter element is being replaced. In the handling of the used filter element 37 that has been removed from the filter bowl 13, this structure reduces the risk of fouling of the environment.

Figure 2:
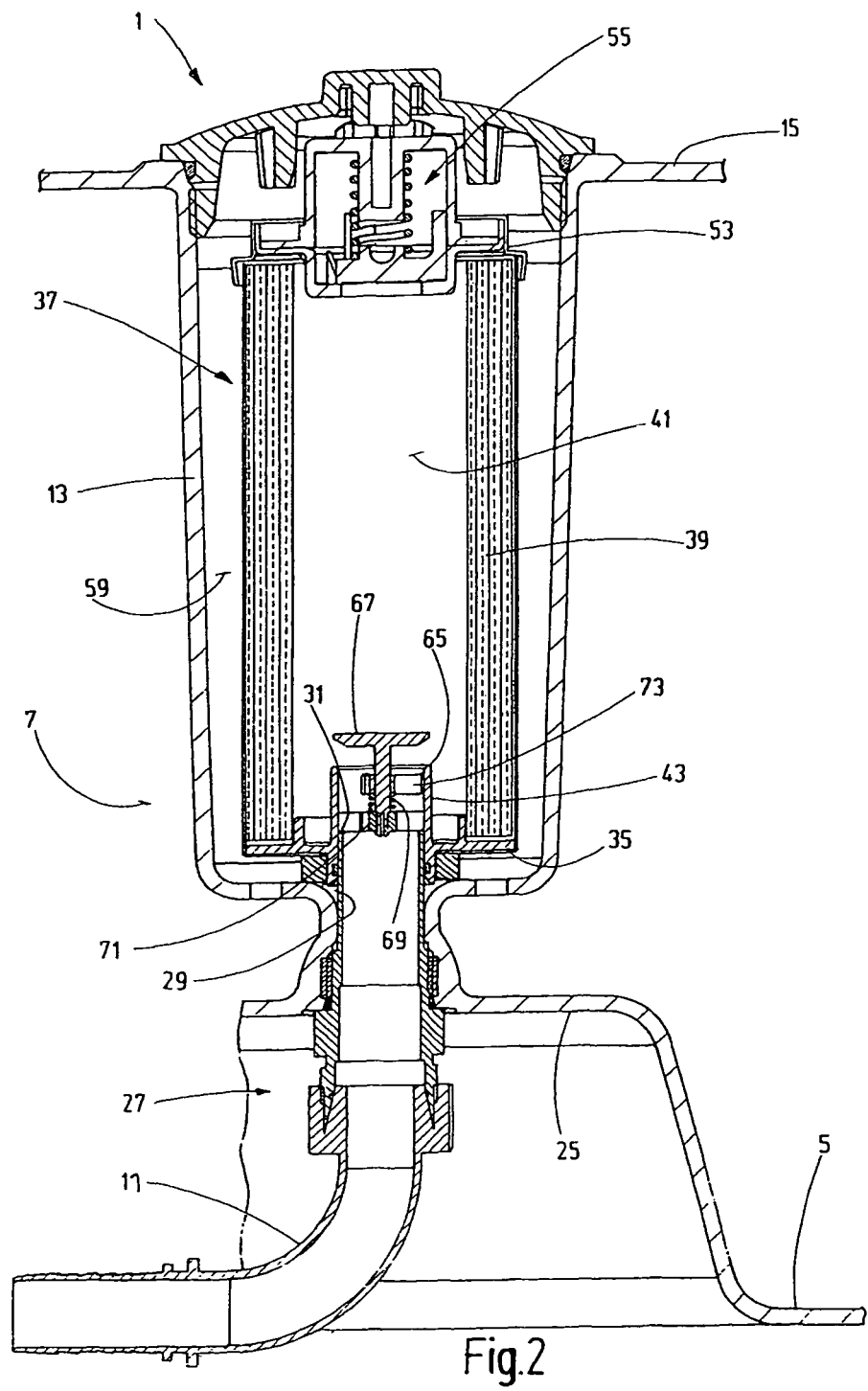
FIG. 2 is a side elevational view in section of a fluid tank with a filter device according to a second exemplary embodiment of the invention.

The exemplary embodiment shown in FIG. 2 differs from the first exemplary embodiment only by the construction of the valve arrangement on the inlet fitting 43 of the end cap 35. In this exemplary embodiment, the inlet fitting 43 is extended into the interior of the filter cavity 41. The free end 65 of the inlet fitting 43 is then located above the end 31 of the connection fitting 29. With its free end 65, the inlet fitting 43 forms a valve seat for a disk-shaped valve body 67 of the valve arrangement. In the operating position shown in FIG. 2, the axially movable valve body 67 is raised off the end of the inlet fitting 43 against the action of a closing spring 69 because the connection fitting 29 with its inner end 31 has moved a spring carrier 71 upward, which spring carrier is movably guided within the inlet fitting 43. As a result of this movement, the valve body 67 is moved up and raised off the valve seat, with the closing spring 69 being more strongly compressed between the spring carrier 71 and a second spring carrier 73 located stationary in the inlet fitting 43. If at this point the filter element 37 is pulled off the element receiver and removed from the filler bowl 13 when the element is being changed, the closing spring 69 is only partially released such that the valve body 67 moves onto the valve seat on the end 65 of the inlet fitting 43 and closes the inlet fitting 43. Thus, the second exemplary embodiment works in exactly the same way as in the example of the first embodiment. Since, except for the different design of the valve arrangement, in the two exemplary embodiments, the other components are comparable, not all details which are made the same in the two exemplary embodiments are numbered in FIG. 2.

While various embodiments have been chosen to illustrate the invention, it will be understood by those skilled in the art that various changes and modifications can be made therein without departing from the scope of the invention as defined in the appended claims.

What is claimed is:

1. A filter device, comprising:
a fluid tank having a bottom-side wall section;
a filter housing connected in fluid communication with said fluid tank and formed as a filter bowl integrally molded into said fluid tank, said filter housing having a housing bottom;
a filter element received in said filter housing;
a connection fitting being on said housing bottom, providing a fluid connection to said filter element and being coupled to said filter element in an operational position of said filter element; and
a connection piece being integrally molded on said housing bottom, being joined in said bottom-side wall section and having a passage through which said connection fitting extends from an outside of said fluid tank into said filter bowl.

2. A filter device according to claim 1 wherein said bottom-side wall section of said fluid tank comprises a local indentation extending away from a base of said fluid tank and adjoining said connection piece.

3. A filter device according to claim 1 wherein said connection fitting is fixed in said connection piece by a screw union.

4. A filter device according to claim 1 wherein said fluid tank and said filter bowl are integrally molded together of plastic.

5. A filter device according to claim 1 wherein said filter bowl is open on an upper wall of said fluid tank and is closed by a plastic cover threaded to an internal thread located on an opening edge region of said filter bowl such that said cover has an outside forming a part of said upper wall of said fluid tank.

6. A filter device according to claim 1 wherein said connection fitting supplies unfiltered fluid to a dirty side of said filter element and interacts with said filter element.

7. A filter device, comprising:
a fluid tank having a bottom-side wall section;
a filter housing connected in fluid communication with said fluid tank and formed as a filter bowl integrally molded into said fluid tank, said filter housing having a housing bottom;
a filter element received in said filter housing;
a connection fitting being on said housing bottom, providing a fluid connection to said filter element and being coupled to said filter element in an operational position of said filter element; and
a connection piece being integrally molded on said housing bottom and on said bottom-side wall section and having a passage through which said connection fitting extends from an outside of said fluid tank into said filter bowl, said bottom-side wall section of said fluid tank including a local indentation extending away from a base of said fluid tank and adjoining said connection piece.

8. A filter device according to claim 7 wherein said connection fitting is fixed in said connection piece by a screw union.

9. A filter device according to claim 7 wherein said fluid tank and said filter bowl are integrally molded together of plastic.

10. A filter device according to claim 7 wherein said filter bowl is open on an upper wall of said fluid tank and is closed by a plastic cover threaded to an internal thread located on an opening edge region of said filter bowl such that said cover has an outside forming a part of said upper wall of said fluid tank.

11. A filter device according to claim 7 wherein said connection fitting supplies unfiltered fluid to a dirty side of said filter element and interacts with said filter element.

12. A filter device, comprising:
a fluid tank having a bottom-side wall section;
a filter housing connected in fluid communication with said fluid tank and formed as a filter bowl integrally molded into said fluid tank, said filter housing having a housing bottom;
a filter element received in said filter housing;

a connection fitting being on said housing bottom, providing a fluid connection to said filter element and being coupled to said filter element in an operational position of said filter element; and a connection piece being integrally molded on said housing bottom and on said bottom-side wall section and having a passage through which said connection fitting extends from an outside of said fluid tank into said filter bowl, said connection fitting supplying unfiltered fluid to a dirty side of said filter element, said connection fitting interacting with said filter element.

13. A filter device according to claim 12 wherein
said connection fitting is fixed in said connection piece by a screw union.

14. A filter device according to claim 12 wherein
said fluid tank and said filter bowl are integrally molded together of plastic.

15. A filter device according to claim 12 wherein
said filter bowl is open on an upper wall of said fluid tank and is closed by a plastic cover threaded to an internal thread located on an opening edge region of said filter bowl such that said cover has an outside forming a part of said upper wall of said fluid tank.

* * * * *